May 27, 1958 W. H. ODLUM ET AL 2,836,273

REVERSIBLE ONE-WAY DRIVE MECHANISM

Filed June 10, 1953 3 Sheets-Sheet 1

INVENTORS
William H. Odlum and
William F. Hosford
By F. [signature] Brewer
Att'y

REVERSIBLE ONE-WAY DRIVE MECHANISM

Filed June 10, 1953

3 Sheets-Sheet 2

INVENTORS
William H. Odlum &
William F. Hosford
By [signature]
Att'y

May 27, 1958 W. H. ODLUM ET AL 2,836,273

REVERSIBLE ONE-WAY DRIVE MECHANISM

Filed June 10, 1953 3 Sheets-Sheet 3

INVENTORS
William H. Odlum &
William F. Hosford
By [signature]
Atty 2,836,273

REVERSIBLE ONE-WAY DRIVE MECHANISM

William H. Odlum, Wilmette, and William F. Hosford, Chicago, Ill., assignors to Duro Metal Products Co., Chicago, Ill., a corporation of Illinois Application June 10, 1953, Serial No. 360,668
5 Claims. (Cl. 192—43.1)

This invention relates to reversible one-way drive mechanisms and particularly to those adapted for use for driving tools and the like.

In our copending application Serial No. 278,089, filed March 22, 1952, for Reversible Drive Mechanisms, now Patent No. 2,686,582 there is disclosed a control mechanism for a reversible one-way drive device for a socket wrench wherein the control element is in the form of a disk having a knurled beveled edge, the disk being disposed concentrically with respect to the axis of the device. By turning the disk through a predetermined angle either clockwise or counterclockwise with respect to the device, the direction of drive may be determined. It has been found, however, that the mechanics for whom the device is intended, frequently exert pressure upon the device through the disk to hold the device in place on the mechanism being driven thereby. The pressure is generally effected through the palm of one hand of the operator while the other hand is utilized in turning the device. This pressure, being exerted upon the disk which controls the direction of drive, frequently results in an inadvertent turning of the control disk and causes an unwarranted and undesirable change in the direction of drive produced by the mechanism.

The principal object of this invention is to provide a control for a reversible one-way drive device wherein said control is not disturbed by the hand of the operator when the operator exerts pressure upon the device to hold it against the article to be driven.

It has also been found in the device described in the aforesaid copending application that the disk which controls the direction of drive does not give a visual indication of the direction of drive for which the device may be set and it is accordingly another object of this invention to provide a control element for a reversible one-way drive device wherein said control element has two clearly visible positions, each position corresponding to a direction of drive for the device.

A more specific object of this invention is to provide a control mechanism for a reversible one-way drive device wherein the mechanism is definitely urged to one or the other of its two positions by resilient means to avoid a partial engagement of the one-way drive mechanism in the device.

A feature of this invention is a one-way drive device having a smooth surface against which the palm of a mechanic's hand may be pressed when the device is in use.

For purposes of illustration, this invention will be described with reference to its application to the driving member of a socket wrench but it is understood that the invention is applicable generally wherever a reversible or controllable one-way drive mechanism is required.

The foregoing and other objects of this invention will become apparent from the following description and the accompanying drawings in which.

Figure 5:
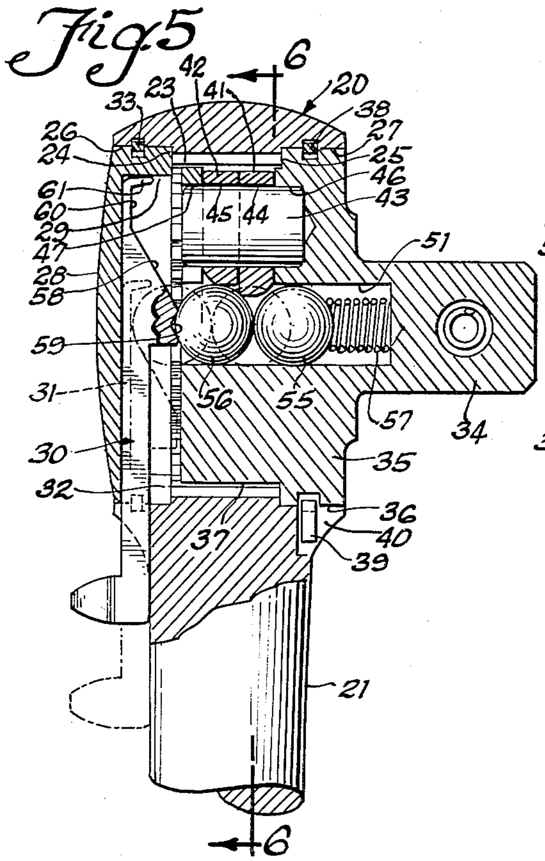
Fig. 5 is an enlarged partly sectioned side elevational view of the device taken along line 5—5 of Fig. 2.

Referring now to Figs. 1 to 7 inclusive for a detailed description of this invention, there is shown a tool having a head 20 formed integrally with a lever 21 terminating in a handle 22 at the opposite end thereof. Said head 20 is circular in form and is generally hollow as shown in Fig. 5. Disposed centrally within said head are ratchet teeth 23 having a saw tooth profile as shown more clearly in Fig. 6. On either side of teeth 23 are shoulders 24 and 25, connecting the teeth 23 with counterbores 26 and 27, respectively. Within counterbore 26 is disposed a cap 28, the right part of which, as viewed in Fig. 5, has a recess 29 for the reception of a slidable control key 30. A groove 31 is provided in the bottom of recess 29 to act as a guide for control key 30. An opening 32 is formed in the bottom edge of cap 28 as viewed in Fig. 5 through which control key 30 extends to the exterior of the mechanism where it may be available to the operator or user of the mechanism. Cap 28 is retained in counterbore 26 with the aid of a snap ring 33.

Figure 1:
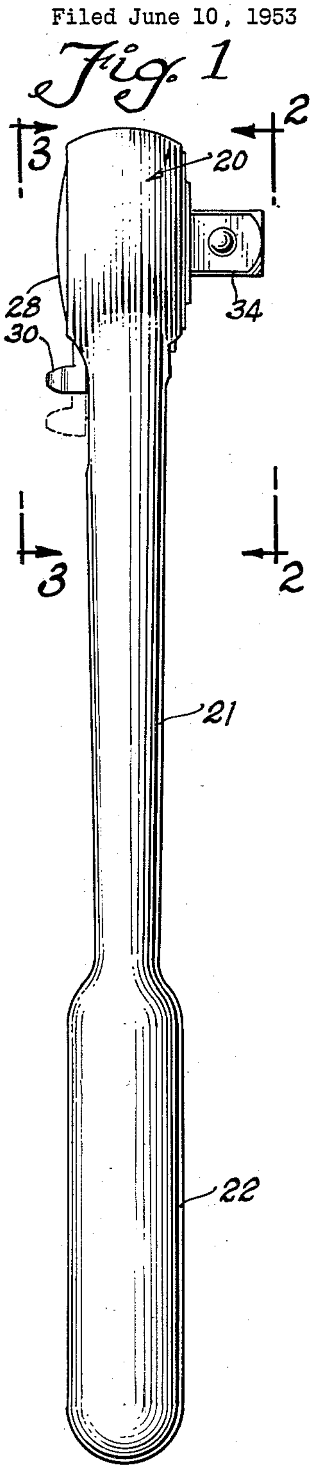
Figs. 1, 2 and 3 are respectively side, front and rear elevational views of a driving tool embodying the reversible one-way drive mechanism of this invention.
Figure 2:
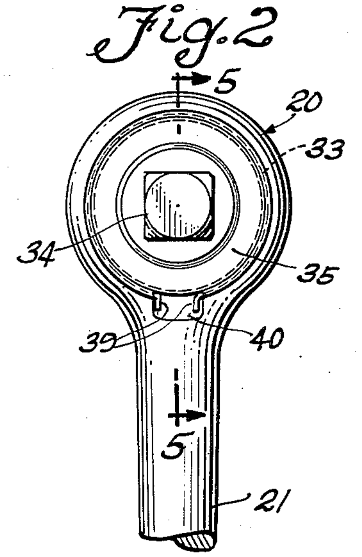
Figure 3:
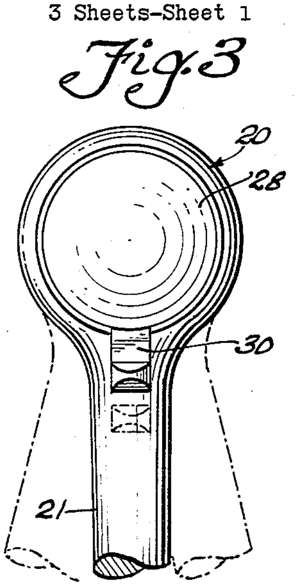
Figure 4:
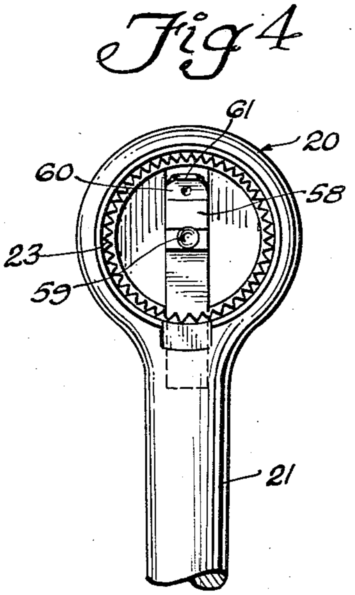
Fig. 4 is a view corresponding to Fig. 2 with the greater portion of the mechanism removed.

In counterbore 27 is disposed a drive transmitting element 34 which may have a rectangular cross section, as shown in Fig. 2, to fit into a rectangular recess in a socket wrench (not shown) to drive the latter. Said drive transmitting element 34 is formed integrally with a substantially cylindrically shaped pawl holder 35 having a cylindrical flange 36 received snugly in counterbore 27 and a portion of reduced diameter 37 nested within teeth 23 with ample clearance to prevent contact between said teeth 23 and reduced diameter portion 37. A snap ring 38 having out-turned ends 39 serves to hold flange 36 in counterbore 27. Head 20 is cut away at 40 to receive the out-turned ends 39 of snap ring 38.

A pair of pawls 41 and 42 (Fig. 6) is mounted in reduced diameter portion 37 by means of a pin 43 passing through suitable openings 44 and 45, respectively, in pawls 41 and 42 so that each pawl 41 and 42 is free to turn or pivot on pin 43. Said pin 43 extends beyond pawls 41 and 42 in a recess 46 adjacent pawl 41 in portion 37, and into an opening 47 adjacent pawl 42 likewise in portion 37.

Each pawl 41 and 42 is comprised of an arm 48 having teeth 49 formed in the end thereof to engage teeth 23 in head 20. Each of said pawls 41 and 42 is also formed with a cam 50 extending generally downward from pin 43 as viewed in Figs. 1 and 6 into a transverse bore 51 in drive transmitting element 34. Pawls 41 and 42 operate in a slot 52 extending diametrically across reduced diameter portion 37. A coil spring 53 is compressed between the toothed end of arm 48 and the bottom of slot 52 to urge teeth 49 of pawl 41 into engagement with teeth 23 of head 20. A similar coil spring 54 is compressed between the toothed arm 48' of pawl 42 and the bottom of slot 52 to urge the teeth 49' of pawl 42 into engagement with teeth 23 of head 20.

Figure 6:
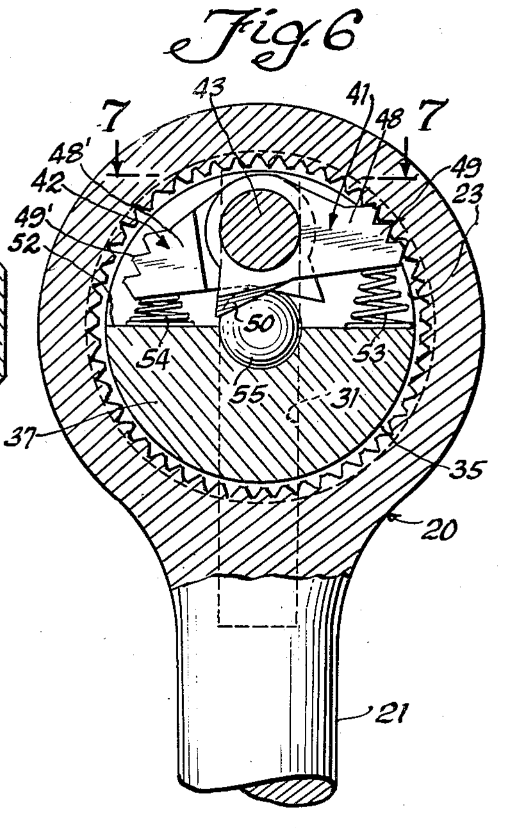
Fig. 6 is a partly sectioned elevational view taken along line 6—6 of Fig. 5.

To simplify the manufacture of said pawls 41 and 42, the pawls may be identical in all respects, but pawl 41 is mounted on pin 43 with arm 48 extending to the right of pin 43 as viewed in Fig. 6 and pawl 42 is mounted on said pin 43 with its toothed arm extending to the left of said pin 43.

It may be observed that pawls 41 and 42 are independent of one another and may pivot about pin 43 individually or simultaneously as desired. It may be observed further that in view of the fact that each pawl is reversed with respect to the other in so far as its mounting on pin 43 is concerned, pawl 41 will transmit a drive from head 20 to reduced diameter portion 37 when head 20 is rotated in a counterclockwise direction as viewed in Fig. 6 and pawl 42 will transmit rotation from head 20 to drive transmitting element 34 in a clockwise direction as viewed in Fig. 6. When the direction of rotation is clockwise as viewed in Fig. 6, pawl 41 will ratchet over teeth 23, spring 53 being alternately compressed and released as the teeth of the pawl pass over the teeth 23 of the head, and pawl 42 will transmit no drive from head 20 when the direction of rotation of said head as viewed in Fig. 6 is counterclockwise.

Thus, by rendering one or the other of the pawls 41 and 42 inoperative, that is, by holding it out of contact with teeth 23, the direction of drive from head 20 to reduced diameter portion 37 may be controlled.

The control mechanism for pawls 41 and 42 in its preferred form is shown in Fig. 5. This mechanism comprises a pair of balls 55 and 56 disposed in transverse bore 51 and urged to the left as viewed in Fig. 5 by a coil spring 57. Said balls 55 and 56 are free to roll in transverse bore 51 but are of a size to fill the bore substantially completely to prevent substantial radial movement of the balls in said bore. The cam surface 50 of each pawl is adapted to be contacted by the spherical surface of a ball 55 or 56 and is so designed that as the ball moves axially in bore 51 and contacts said cam surface 50, a torque will be created in the pawl acting in opposition to the torque created by springs 53 or 54 to rotate the pawl to a position where its teeth are out of contact with teeth 23 and head 20. By holding a ball in an axial position in bore 51 which is such that the center of a ball is aligned vertically as viewed in Fig. 5 with the high point of cam 50, the pawl will be held in released or disengaged position. Ball 55 is used to control the release of pawl 41 and ball 56 controls the release of pawl 42. The proportions of the balls relative to the thickness of the pawls 41 and 42 and the cams 50 on said balls are so chosen that when said balls are placed in side-by-side relation as shown in Fig. 5 and moved simultaneously axially in bore 51 from the position shown in dotted lines in said figure, pawl 41 will be engaged with teeth 23 under the action of spring 53 while ball 56 holds pawl 42 disengaged, and in the dotted position ball 55 will hold pawl 41 in disengaged position while pawl 42 is free of ball 56 and hence engages teeth 23 under the action of spring 54.

The movement of balls 55 and 56 in bore 51 is effected by control key 30. Said key is provided with a cam surface 58 upon which ball 56 may ride as the key is reciprocated in its groove 31. A circular pocket 59 is formed at the right-hand end (Fig. 5) of cam surface 58 in which ball 56 may seat. A flat dwell is provided at 60 against which ball 56 may abut when key 30 is moved to the dotted position shown in Fig. 5. A flange 61 is turned up at the end of key 30 to hold ball 56 on dwell 60 and also to form a stop for key 30 by abutting against the side of recess 29 when said key 30 is moved upward in said Fig. 5. The distance of flange 61 from pocket 59 is so chosen that said flange 61 will abut the side of recess 29 when pocket 59 is aligned with the center of bore 51.

Figure 7:
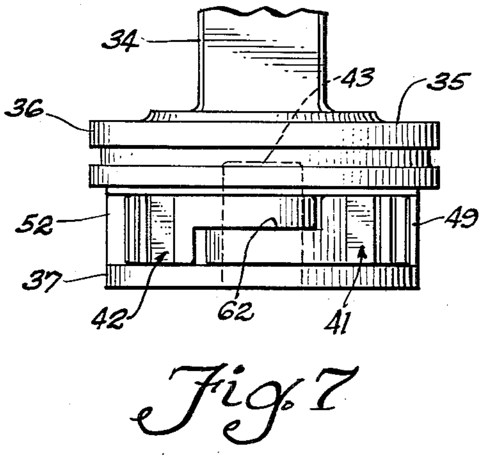
Fig. 7 is a top view of a sub-assembly, taken along line 7—7 of Fig. 6.

To avoid any possibility of the pawls 41 and 42 cocking in slot 52, each is made of a width at the teeth 49 and arm 48 substantially coextensive with the width of slot 52 but is reduced to one-half the width of slot 52 at the pin 43, as shown at 62 in Fig. 7, so that when both pawls 41 and 42 are mounted on pins 43 their combined thickness at pin 43 is substantially the same as the thickness of each pawl at teeth 49.

To operate the reversible one-way drive mechanism disclosed in Figs. 1 to 7 inclusive, the desired direction of drive is first determined upon and then control key 30 is moved to the position corresponding to the selected direction of drive. Thus, if the desired direction of drive is counterclockwise as viewed in Fig. 6, key 30 is moved to the solid position shown in Fig. 5 whereupon balls 56 and 55 are moved to the right as shown in Fig. 5 along cam surface 58 until ball 56 seats in pocket 59 to assume the solid position shown in said Fig. 5. This causes ball 56 to operate upon the cam 50' of pawl 42 to turn said pawl 42 counterclockwise as viewed in Fig. 6 about its pin 43 against the action of spring 54 until the pawl 42 assumes the position shown in Fig. 6. In this position teeth 49' of pawl 42 are out of contact with teeth 23 of head 20 and said pawl 42 is ineffectual to transmit any drive from head 20 to pin 43 and drive transmitting element 34. Simultaneously with the rotation of pawl 42 in a counterclockwise direction, as viewed in Fig. 6, pawl 41 is likewise moved in a counterclockwise direction by reason of the fact that neither ball 55 nor 56 is in a position to contact cam 50 on pawl 41. Spring 53, therefore, is free to urge arm 48 and its teeth 49 toward teeth 23 to effect engagement between teeth 49 and teeth 23, and to effect a drive from head 20 to pin 43 and drive transmitting element 34 in a counterclockwise direction as viewed in Fig. 6. It may be noted that both balls 55 and 56 are substantially out of contact with cam 50 and said cam is, therefore, free to oscillate about pin 43 from the position shown in Fig. 6 to a position where the tips of teeth 49 ride over the tips of teeth 23. This latter position arises while the head 20 is moved in a clockwise (non-driving) direction to start another cycle of drive.

Figure 8:
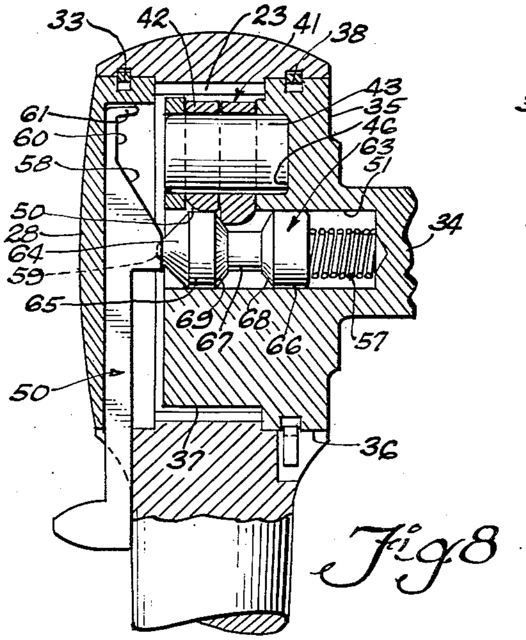
Fig. 8 is a fragmentary side elevational view partly in section of a modification of the device shown in Fig. 5.

The modification shown in Fig. 8 is substantially identical with the one shown in Figs. 1 to 7 inclusive with the exception of the substitution of a spool 63 for the balls 55 and 56 of Fig. 5, for example. Spool 63 is comprised of a conical end section 64 which is adapted to seat itself in circular pocket 59 in one position of key 30 and is adapted to ride down cam surface 58 to the flat dwell 60 in the other position of said key 30. Said spool 63 is provided with spaced cylindrical sections 65 and 66 separated by a cylindrical section 67 of reduced diameter. Frusto-conical shoulders 68 and 69 connect cylindrical section 65 with cylindrical section of reduced diameter 67 and act as camming surfaces to cooperate with cam surfaces 50 and 50' on pawls 41 and 42 respectively to rotate said pawls to their inoperative positions.

The operation of the modification shown in Fig. 8 is identical with that shown in Figs. 5, 6 and 7, spool 63 moving axially in bore 51 in response to movement of key 30 to its extreme positions to release one or the other of the pawls 41 and 42.

Figure 12:
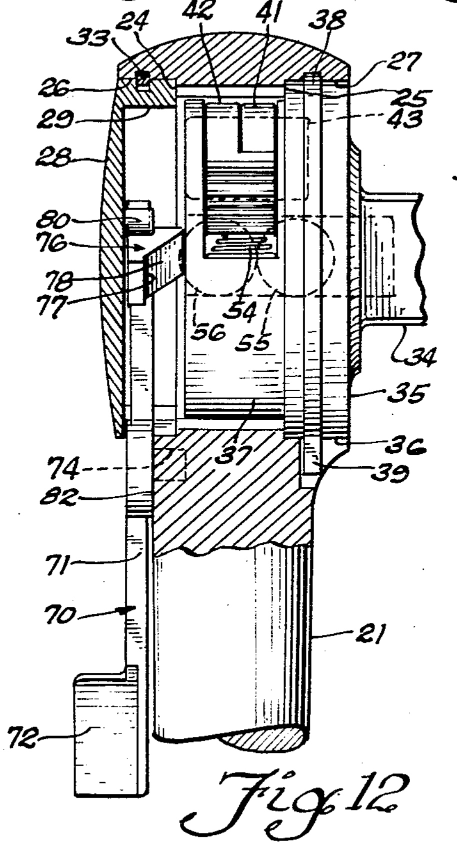
Fig. 12 is an enlarged side elevational view of the device of Fig. 9 taken along the line 12—12 of Fig. 9.
Figure 13:
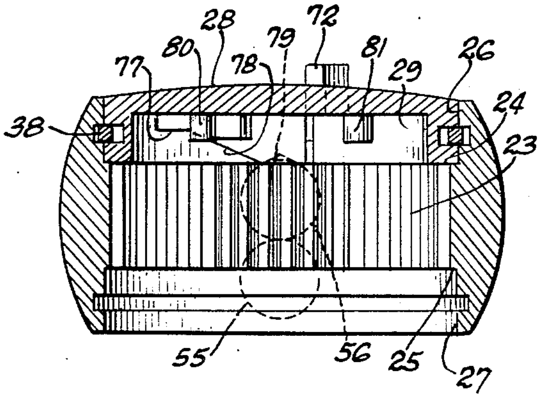
Fig. 13 is an enlarged cross section through the device or a portion of the device shown in Fig. 11, said Fig. 13 being taken along the line 13—13 of Fig. 11.

The modification shown in Figs. 9 to 13 inclusive may be identical with the form shown in Figs. 5, 6 and 7 or the form shown in Fig. 8, except that the external control means, instead of being a reciprocating key such as 30 in said Figs. 5 to 8 inclusive, is a pivoted lever which may be oscillated across the device. The cam surface 58 is correspondingly changed from an inclined to an arcuate surface. Referring now to Figs. 9 to 14 inclusive, the pivoted control lever is shown at 70 and comprises an arm 71 extending downward as viewed in Figs. 9, 10, 11 and 13, and terminating in a flat projection 72 which may be contacted by the thumb or finger of the operator. Said lever 70 is provided with a pivot pin 73 adapted to be received in a recess 74 in which it is free to turn. On the opposite side of pivot pin 73 from arm 71 is another arm 75 (Fig. 11) near the outer end of which is a curved cam 76. Said curved cam 76 is formed with a relatively flat dwell 77, a rising cam surface 78, and a pocket 79 into which a ball such as 56 (Fig. 13) may seat. The extremes of movement of arm 75 are determined by stops 80 and 81. Said stops 80 and 81 may be in the form of pins which are set into the recess 29. To accommodate the relatively long lever 70, a portion of the lever 21 near head 20 is machined off as shown in Fig. 12 at 82.

Figure 9:
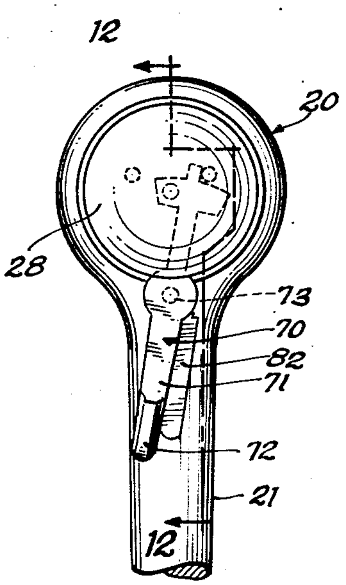
Figs. 9 and 10 are rear and side elevational views of a further modification of the reversible one-way drive mechanism.
Figure 10:
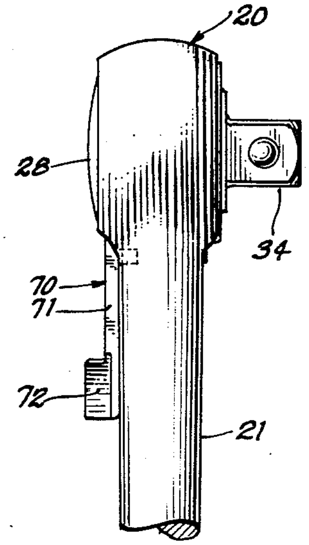
Figure 11:
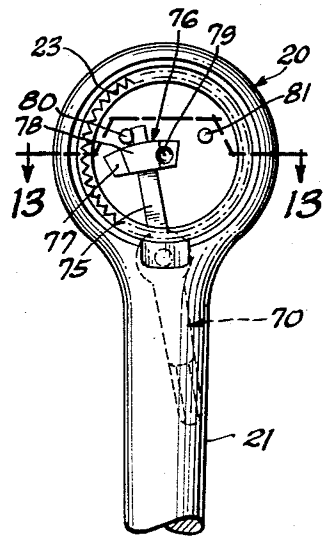
Fig. 11 is a rear elevational view of the device of Fig. 9 with a portion of the mechanism removed to show the control element therefor.

The operation of the form shown in Figs. 9 to 13 inclusive is identical to that shown in Figs. 1 to 8 inclusive in so far as the pawls and their immediate operating mechanisms (either balls 55, 56 or spool 63) are concerned. The movement of the balls 55, 56 or spool 63 is effected by swinging arm 71 of lever 70 either to the left as shown in Fig. 9 which corresponds to a condition of the ratchet pawls and balls or spool as shown in Figs. 5 and 8, or to the right (not shown) which reverses the operation of the pawls.

It may be observed that in each of the three modifications, a reversible one-way drive mechanism has been disclosed wherein the direction of drive is determined by the position of a visible control mechanism which is either a slidable key or a pivoted lever. The direction of drive for which the device is set can be seen at a glance by the operator and hence all guesswork in the operation of the device is eliminated. Pressure upon cap 28 while the device is in operation has no effect upon the direction of drive for which the device is set. The relative cost of the three modifications may vary somewhat, the form shown in Fig. 5 for example being possibly less expensive than the form shown in Fig. 8 since balls 55 and 56 may be standard balls which are readily obtainable and are easily mass produced. The spool form shown in Fig. 8 may require centerless grinding in order to secure a satisfactory fit in bore 51 and hence may be slightly more expensive.

Although this invention has been described with reference to its application to a tool for operating a socket wrench, it is understood that the invention has application in other fields where reversible one-way drive means may be found desirable or necessary. The scope of this invention therefore, should not be limited to the forms disclosed and described hereinabove but is to be determined by the appended claims.

Having thus described our invention, what we claim as new and desire to secure by Letters Patent of the United States is:

1. A controllable one-way drive device comprising a head, a lever secured to and extending from said head, a drive member mounted in said head and rotatable therein, internal teeth in said head, a pair of pawls pivotally mounted on said drive member about the same axis in overlying relation to one another, one of said pawls being adapted to contact the teeth in said head to establish a one-way drive between the head and member in one direction and the other of said pawls being adapted to contact the teeth in said head to establish a one-way drive between the head and member in the opposite direction, spring means normally biasing each pawl into engagement with said teeth, and means mounted on the head independently of the drive member for mutually exclusively disengaging said pawls from said teeth to establish a one-way drive in one direction only between the head and drive member.

2. A controllable one-way drive device comprising a head, a lever secured to and extending from said head, a drive member mounted in said head and rotatable therein, a pair of pawls mounted in said head and pivoted on axes substantially parallel with the axis of rotation of said drive member, each of said pawls having a cam thereon, a cap for the head, and means external to the cap and having an operating connection to the pawls to control the positions of said pawls, said control means having a part reciprocable transversely of the axis of said pawls, and including an operator for each cam and common means for actuating said operators.

3. A controllable one-way drive device comprising a head, a lever secured to and extending from said head, a drive member mounted in said head and rotatable therein, a pair of pawls mounted in said head and pivoted on axes substantially parallel with the axis of rotation of said drive member, a cap for the head, and means external to the cap and provided with an operating connection to the pawls to control the operation of said pawls, said control means being reciprocable transversely of the axis of said pawls, said drive member having an axially extending bore, and a slot intersecting said bore, means pivotally mounting said pawls in the slot, and cams on each pawl adapted to extend into the bore, said control means comprising an operator for each cam disposed in the bore and reciprocable in the bore to actuate the cams, and cam means mounted for movement crosswise of the bore and adapted to contact an operator to effect reciprocation thereof as aforesaid.

4. A controllable one-way drive device comprising a head, a lever secured to and extending from said head, a drive member mounted in said head and rotatable therein, a pair of pawls mounted in said head and pivoted on axes substantially parallel with the rotation of said drive member, a cap for the head, and means external to the cap and having an operating connection to the pawls to control the operation of said pawls, said control means being reciprocable transversely of the axis of said pawls, said drive member having an axially extending bore, a slot intersecting said bore, means pivotally mounting said pawls in the slot, and cams on each pawl adapted to extend into the bore, the said operating connection to the pawls in said control means comprising a pair of balls, a spring urging said balls across the slot in one direction to contact the cams on the pawls, and a cam reciprocable across the bore to move the balls in the bore in opposition to the spring.

5. A controllable one-way drive device comprising a head, a lever secured to and extending from said head, a drive member mounted in said head and rotatable therein, a pair of pawls mounted in said head and pivoted on axes substantially parallel with the axis of rotation of said drive member, a cap for said head, and means external to the cap and having a connection to the pawls to control the operation of said pawls, said control means being reciprocable transversely of the axis of said pawls, said drive member having an axially extending bore, and a slot intersecting said bore, means pivotally mounting said pawls in the slot, and cams on each pawl adapted to extend into the bore, said control means comprising a spool having a portion of reduced diameter into which the cams on the pawls may extend, a spring urging said spool across the slot, and a cam reciprocable across the bore and contacting the end of the spool to move the spool in the bore in opposition to the spring.

References Cited in the file of this patent

UNITED STATES PATENTS

| | | |
|---|---|---|
| 872,635 | Averbeck | Dec. 3, 1907 |
| 1,163,500 | Ball | Dec. 7, 1915 |
| 2,134,405 | Hulshizer | Oct. 25, 1938 |
| 2,134,420 | Smith | Oct. 25, 1938 |
| 2,138,331 | Ward | Nov. 29, 1938 |
| 2,138,332 | Geisel | Nov. 29, 1938 |
| 2,202,402 | Rueb | May 28, 1940 |
| 2,206,943 | Costello | July 9, 1940 |
| 2,233,091 | Becker | Feb. 25, 1941 |
| 2,353,901 | Jires | July 18, 1944 |
| 2,583,617 | Walraven et al. | Jan. 29, 1952 |
| 2,620,051 | Kaplan | Dec. 2, 1952 |